United States Patent
Brück et al.

(10) Patent No.: US 10,030,561 B2
(45) Date of Patent: Jul. 24, 2018

(54) METHOD FOR OPERATING A DEVICE FOR THE DOSED SUPPLY OF A LIQUID

(71) Applicant: CONTINENTAL AUTOMOTIVE GMBH, Hannover (DE)

(72) Inventors: Rolf Brück, Bergisch Gladbach (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/786,363

(22) PCT Filed: Apr. 16, 2014

(86) PCT No.: PCT/EP2014/057833
§ 371 (c)(1),
(2) Date: Oct. 22, 2015

(87) PCT Pub. No.: WO2014/173786
PCT Pub. Date: Oct. 30, 2014

(65) Prior Publication Data
US 2016/0108785 A1 Apr. 21, 2016

(30) Foreign Application Priority Data

Apr. 26, 2013 (DE) .................. 10 2013 104 250

(51) Int. Cl.
*F04B 45/08* (2006.01)
*F01N 3/20* (2006.01)
(Continued)

(52) U.S. Cl.
CPC .............. *F01N 3/208* (2013.01); *F04B 43/02* (2013.01); *F04B 53/10* (2013.01); *F04C 5/00* (2013.01);
(Continued)

(58) Field of Classification Search
CPC ........ F04B 9/045; F04B 43/123; F04B 45/08; F04B 49/02; F04B 2201/12041;
(Continued)

(56) References Cited

U.S. PATENT DOCUMENTS 4,332,534 A 6/1982 Becker
5,988,998 A * 11/1999 Glover ................. F04C 5/00
418/153
(Continued)

FOREIGN PATENT DOCUMENTS

CN 85102462 9/1986
DE 92 11 095 U1 12/1993
(Continued)

*Primary Examiner* — Jonathan Matthias
(74) *Attorney, Agent, or Firm* — Cozen O'Connor

(57) ABSTRACT

A method for operating a device configured to provide a dosed supply of a liquid. The device has: a pump delivering the liquid and having a pump housing having an inlet and an outlet, an eccentric on the pump housing, and a deformable diaphragm arranged between the pump housing and the eccentric. The deformable diaphragm and the pump housing delimit a delivery path from the inlet to the outlet and form at least one seal of the delivery path, the seal being displaceable along the delivery path by a movement of the eccentric to deliver the liquid. The method comprises: detecting a demanded dose amount of the liquid; activating the pump to deliver the liquid by the pump; stopping operation of the pump when the delivered amount of the liquid corresponds to the demanded dose amount; deactivating the pump when the eccentric is situated in a predefined park position.

10 Claims, 3 Drawing Sheets

(51) Int. Cl.
  *F04C 5/00*   (2006.01)
  *F04C 14/06*  (2006.01)
  *F04B 43/02*  (2006.01)
  *F04B 53/10*  (2006.01)

(52) U.S. Cl.
  CPC ............ *F04C 14/06* (2013.01); *F01N 3/2066* (2013.01); *F01N 2610/02* (2013.01); *F01N 2610/144* (2013.01); *F01N 2610/1433* (2013.01); *F01N 2900/14* (2013.01); *F04C 2220/24* (2013.01); *Y02A 50/2325* (2018.01); *Y02T 10/24* (2013.01)

(58) Field of Classification Search
  CPC .... F04B 2201/12051; F04B 2201/1208; F01N 2610/144
  See application file for complete search history.

(56) References Cited

U.S. PATENT DOCUMENTS

| | | | |
|---|---|---|---|
| 7,267,531 B2 | 9/2007 | Anderson et al. | |
| 2005/0047925 A1* | 3/2005 | Davis ................... | B41J 2/17596 417/53 |
| 2009/0192732 A1* | 7/2009 | Huebner ................ | F01N 11/00 702/50 |
| 2009/0301064 A1 | 12/2009 | Maier et al. | |
| 2012/0148415 A1 | 6/2012 | Brueckner | |
| 2013/0047587 A1* | 2/2013 | Maus ................... | F01N 3/2066 60/295 |
| 2014/0017094 A1 | 1/2014 | Ghodsi-Kameneh et al. | |
| 2014/0033684 A1 | 2/2014 | Hodgson et al. | |

FOREIGN PATENT DOCUMENTS

| | | | |
|---|---|---|---|
| DE | 102 10 213 A1 | 9/2003 | |
| DE | 60 2004 010 185 T2 | 11/2008 | |
| DE | WO 2011134893 A1 * | 11/2011 | .......... F01N 3/2066 |
| DE | 10 2010 053 903 A1 | 6/2012 | |
| DE | 10 2011 016967 A1 | 10/2012 | |
| GB | 768253 A | 2/1957 | |
| JP | 32-003080 U1 | 5/1957 | |
| JP | H07-54776 | 2/1995 | |
| JP | H10-77969 | 3/1998 | |
| JP | 2002-130153 | 5/2002 | |
| JP | 2002-285977 | 10/2002 | |
| JP | 2004-156489 | 6/2004 | |
| JP | 2007-154831 | 6/2007 | |
| WO | WO 2012/126544 A1 | 9/2012 | |

* cited by examiner

METHOD FOR OPERATING A DEVICE FOR THE DOSED SUPPLY OF A LIQUID

CROSS-REFERENCE TO RELATED APPLICATIONS

This is a U.S. national stage of application No. PCT/EP2014/057833, filed on 16 Apr. 2014, which claims priority to the German Application No. DE 10 2013 104 250.3 filed 26 Apr. 2013, the content of both incorporated herein by reference.

BACKGROUND OF THE INVENTION

1. Field of the Invention

The invention relates to a method for operating a device for the dosed supply of a liquid.

2. Related Art

A device of this type may also be referred to as delivery device and/or as dosing device. A device of this type may be used, for example, in a motor vehicle in order to feed a liquid additive for exhaust-gas purification to an exhaust-gas treatment device of the motor vehicle. In exhaust-gas treatment devices requiring a liquid additive for operation, the method of selective catalytic reduction (SCR), for example, is implemented. In this method, nitrogen oxide compounds in the exhaust gas of an internal combustion engine are reduced with the aid of a reducing agent. Ammonia is commonly used as reducing agent. Ammonia is normally stored in motor vehicles not directly but in the form of a reducing agent precursor solution, which is stored as a liquid in a tank and which is supplied by way of a corresponding device, which may be operated in accordance with the method described here. A liquid that is particularly commonly used in this context is urea-water solution which, for the purposes of exhaust-gas purification, is available under the trade name AdBlue® with a urea content of 32.5%.

For successful exhaust-gas purification, accurately dosed metering of the liquid into an exhaust-gas treatment device is necessary, that is to say the amount of liquid metered corresponds as accurately as possible to a requirement in the exhaust-gas treatment device. Furthermore, a device for the dosed supply of a liquid should be producible and operable as inexpensively as possible, and should as far as possible not be damaged by liquid freezing within the device, because the described liquids can freeze at low temperatures. In motor vehicles, low temperatures arise for example during relatively long standstill phases.

For the delivery of such liquids, devices which have a non-branched delivery line from a tank to an injector at an exhaust-gas treatment device have proven to be particularly advantageous. Such devices for providing a supply typically do not have a return line which permits circulation of liquid through the device and back into the tank. A return line of this type was provided because it was possible for air bubbles in the device to be easily and reliably removed via the return line. However, a return line of this type entails increased cost expenditure.

The dosing (i.e., metering) of the liquid by way of the device is preferably performed with the aid of an injector (dosing valve), which can be opened and closed in electronically actuated fashion. The amount of liquid dispensed by the device is in this case typically proportional to the opening time of the injector. For this purpose, the pressure of the liquid prevailing at the injector must correspond as accurately as possible to a target pressure, because the amount of liquid dosed by an injector during a predefined opening time exhibits a high dependency on the pressure of the liquid at the injector.

Between multiple individual dosing processes of the injector, it is desirable for the pressure of the liquid in a pressure line section between a pump and the injector to be kept substantially constant in order that the injector can dose liquid in the desired manner immediately when a dosing demand is placed on the injector.

Devices for the supply of a liquid typically have at least one pump for the delivery of the liquid and for maintaining the pressure at the injector. However, the pumps used for such devices typically have the disadvantage that a backflow of liquid can occur through the pump. As a result of this backflow, the pressure at the injector is falsified, and thus the dosing accuracy is reduced.

SUMMARY OF THE INVENTION

Taking this as a starting point, it is an object of the present invention to solve or at least alleviate the technical problems highlighted in connection with the prior art. It is sought in particular to disclose a particularly advantageous method for operating a device for the dosed supply of a liquid, with which method particularly high dosing accuracy of the supply of the liquid can be achieved.

In accordance with one aspect of the invention, a method is proposed for operating a device for the dosed supply of a liquid, at least having at least one pump for delivering the liquid, wherein the pump has a pump housing with at least one inlet and at least one outlet, an eccentric is arranged on the pump housing, and wherein a deformable diaphragm is arranged between the pump housing and the eccentric, the deformable diaphragm and the pump housing delimiting at least one delivery path from the at least one inlet to the at least one outlet and form at least one seal of the delivery path, wherein the at least one seal is displaceable along the delivery path by a movement of the eccentric for the purposes of delivering the liquid. The method includes:

a) detecting a demanded dose amount of liquid;

b) activating the at least one pump in order to deliver the liquid by means of the at least one pump;

c) scheduling a stoppage of operation of the at least one pump when the delivered amount of liquid corresponds to the demanded dose amount; and d) deactivating the at least one pump when the eccentric is situated in a predefined park position.

The device preferably has a suction line extending from the at least one pump to a tank in which the liquid is stored. The suction line is preferably connected to the inlet of the pump. The device preferably furthermore has a pressure line which extends from the pump to a metering point for the metering of the liquid into an exhaust-gas treatment device. The pressure line is connected to the outlet of the pump. It is also possible for multiple (parallel) suction lines to lead to multiple pumps (for example of different delivery power), which pumps are in each case connected (in particular in non-branched fashion) via pressure lines to an individual injector or to multiple injectors. Further branchings of the line system of the device are preferably not provided. In particular, there is preferably no return line that produces a connection of the outlet of the pump back to the tank.

A pump with the described construction can be referred to as an orbital pump. The delivery path is formed by a gap between the deformable diaphragm and the pump housing. The deformable diaphragm is preferably arranged between the eccentric and the pump housing such that the deformable diaphragm is pinched between the housing and the eccentric in the region of the at least one seal. The gap between the deformable diaphragm and the pump housing is thereby closed in fluid-tight fashion in the region of the at least one seal. The gap or the delivery path is filled with the liquid during the operation of the device. Along the delivery path, the at least one seal divides the delivery path, such that at least one (closed) delivery volume is formed. As a result of the displacement of the seal by way of a movement of the eccentric, the delivery volume is displaced in a delivery direction proceeding from the inlet of the pump toward the outlet of the pump. In this way, delivery of the liquid is performed.

The pump housing of the pump is preferably a ring or a cylindrical chamber in which the eccentric is arranged (centrally) at the inside. The pump housing may then be regarded as an (external) stator of the pump, whereas the eccentric can be referred to as an (internal) rotor. In a further embodiment of the described pump, it is however also possible for the pump housing to form an internal stator of the pump, which is surrounded by the eccentric. The eccentric then forms an external rotor. The inlet and the outlet are arranged on the pump housing and permit the inflow and outflow of the liquid into the pump housing and into the delivery path between the deformable diaphragm and the pump housing.

On the pump, there is preferably also provided at least one partition, which prevents an undesired backflow of the liquid from the outlet to the inlet. This partition may, for example, be in the form of a depression in the pump housing or of a thickened portion of the deformable diaphragm. The partition is arranged (permanently or in positionally fixed fashion) between the outlet and the inlet of the pump. The partition prevents a direct connection for the liquid from the outlet to the inlet from being formed at any time as a result of the movement of the eccentric relative to the pump housing. The partition can also be ensured by virtue of the deformable diaphragm being braced, screwed or adhesively bonded to the housing between the outlet and the inlet.

The eccentric is preferably of multi-part form. The eccentric preferably has an (inner) eccentric region, which performs an eccentric rotational movement, and an (outer) bearing ring, which surrounds the eccentric region. It is preferable for at least one bearing to be situated between the eccentric region and the bearing ring. The bearing may be a ball bearing or a roller bearing. The eccentric region of the eccentric performs a rotational movement about an axis of rotation during operation. An external shape of the eccentric yields an eccentric movement of a surface of the eccentric region. The eccentric movement is transmitted to the bearing ring. The bearing between eccentric region and bearing ring prevents the rotational movement of the eccentric region from being transmitted, together with the eccentric movement, to the bearing ring. Through the combination of an eccentric region and of a bearing ring with bearing arranged in between, an eccentric rotational movement of the eccentric region can be converted into an eccentric wobbling movement of the bearing ring without a rotational movement component. The fact that the movement of the bearing ring does not have a rotational movement component makes it possible for shear stresses in the deformable diaphragm to be reduced. It is preferably the case that the deformable diaphragm is merely flexed by the eccentric. It is preferably the case that only pressure forces, and substantially no friction forces, act at a contact surface of the eccentric with the deformable diaphragm, which friction forces would arise as a result of friction of the eccentric against the diaphragm if the contact surface with the deformable diaphragm were to also exhibit a rotational movement fraction. A corresponding division of the eccentric into an eccentric region and a bearing ring is also possible if the eccentric is an external rotor arranged around a housing which forms an internal stator.

During the operation of the device in accordance with the method described here, it is firstly the case that a demanded dose amount of liquid is detected (step a)). This may be performed, for example, by a control unit which monitors the demand of an exhaust-gas treatment device for liquid and which, in accordance with the demand, defines the amount of liquid to be supplied by way of the device. Thereupon, in step b), the at least one pump is activated in order for (precisely only) the demanded dose amount to be delivered and supplied to a metering point for the metering of the liquid. Here, the pump is driven by way of an (electric) drive, such that the eccentric performs a movement.

Subsequently, in step c), the time at which the amount of liquid delivered by the at least one pump corresponds to the demanded dose amount is determined. This may, for example, be realized by evaluation of the angle by which the eccentric has been rotated and/or of the number of rotations performed by the eccentric since the start of step b). This is possible in particular if the angle or the number of rotations is proportional to the amount of liquid delivered. It is also possible for a throughflow measurement to be performed downstream of the at least one pump (for example at a metering point), with which throughflow measurement the amount of liquid that has already passed to the exhaust-gas treatment device is detected. When it has been detected that the delivered amount corresponds to the demanded dose amount, a stoppage of operation of the pump is scheduled. This is preferably likewise performed in a control unit.

If a stoppage of operation is scheduled, it is, however, not the case in all situations that an immediate deactivation of the pump is performed. As per step d), the deactivation of the pump is performed when the eccentric is situated in a predefined park position. A predefined park position is a particular angular position of the eccentric relative to the housing. Therefore, with the scheduling of the stoppage of operation, the present position of the eccentric is also checked and compared with one or more predefined (possibly pump-specific) park position(s). Thus, after step c), the eccentric may be moved yet further until it has reached a predefined park position. The "deactivation" of the at least one pump thus refers in particular to a standstill of the pump or of the eccentric, but need not imperatively lead to the elimination of the (immediate) operational readiness.

The described method is based on the consideration that it can be advantageous for the eccentric to be brought to a stop only in one defined park position. In this way, particularly accurate monitoring of the position of the eccentric relative to the housing is made possible. By way of a restriction to a discrete number of defined park positions, it is in particular not necessary to provide structure for monitoring the position of the eccentric for every possible position of the eccentric relative to the housing.

The method is particularly advantageous if the eccentric is in force equilibrium when in the predefined park position.

Force equilibrium means that the forces acting on the eccentric cancel one another out, such that the eccentric is not rotated by the acting forces. To maintain the force equilibrium, it is in particular not necessary for additional energy to be actively imparted. For example, it is not necessary for a drive of the pump to be supplied with electrical energy in order to maintain the force equilibrium.

The eccentric is acted on, for example, by pressure forces, which are exerted by the pressure of the liquid within the pump and within the delivery path. Furthermore, friction forces act, which are generated by friction between the movable components of the pump. Furthermore, there may also be an internal resistance to the rotation of the eccentric, the internal resistance being effected, for example, by the deformation of the deformable diaphragm. In the predefined park position, all of the acting forces cancel one another out such that no resultant movement of the eccentric occurs. In general, the more intensely the diaphragm is deformed, the greater the forces exerted on the eccentric by the deformable diaphragm. If the deformable diaphragm has been deformed with particularly great intensity, the forces exerted by the deformable diaphragm on the eccentric are generally particularly high, and possibly even significantly higher than the forces exerted on the eccentric by the pressure of the liquid. The predefined park position of the eccentric is therefore preferably configured such that the deformable diaphragm is subject to relatively little deformation.

Furthermore, internal forces of the drive of an orbital pump may also have an effect on the force equilibrium of the orbital pump. Such internal forces of the drive may be caused, for example, by electromagnets of the drive. In particular, if the drive of the pump comprises at least one permanent magnet, the permanent magnet (even when the drive is deactivated) exerts on the eccentric a force that can influence the force equilibrium on the eccentric such that a predefined park position without resultant forces on the eccentric is displaced by the at least one permanent magnet.

The described method is particularly advantageous if, in the predefined at least one park position, the at least one seal closes off the at least one outlet of the pump.

Here, it is very particularly preferable for all of the outlets of the pump to be closed off by way of the at least one seal. The liquid in the delivery path, owing to its pressure, exerts forces on the eccentric and on the deformable diaphragm. Depending on the orientation of the eccentric, the forces may act with a radial direction and/or a tangential direction. Here, radial forces are directed toward the axis of rotation of the eccentric, whereas tangential forces run tangentially with respect to the axis of rotation of the eccentric. Radially oriented forces basically do not pose problems, whereas tangential forces may exert a torque on the eccentric. If the predefined park position is oriented such that the at least one seal closes off, or is positioned directly opposite, the at least one outlet of the pump, only a radial pressure force can be exerted from the outlet on the deformable diaphragm or on the eccentric. The pressure force from the outlet is definitive of the torque acting on the eccentric, because the pressure at the outlet of the pump generally greatly exceeds the pressure at the inlet of the pump. A closure of the outlet of the pump by way of the seal thereby reduces the torques acting on the deformable diaphragm and on the eccentric. It is preferable for the entire delivery path between the deformable diaphragm and the pump housing to be connected to the inlet of the pump, such that pressure equalization with the inlet is possible, when the eccentric is situated in the predefined park position. A uniform pressure in the delivery duct can thus be realized. The torques exerted on the eccentric by the pressure forces then cancel one another out.

The specification of a park position therefore makes it possible to prevent an undesired rotation of the eccentric of the pump during an interval between multiple dosing processes of the pump. Here, the waiting time describes a time period between step d) and a new execution of the described method (commencing with step a)). Accordingly, the pressure in a pressure line from the pump to the injector can be maintained without an expenditure of energy being necessary for this purpose.

The described method is particularly advantageous if, in the predefined park position, the at least one seal is arranged downstream of the inlet of the pump by a predefined angle in the delivery direction. Here, the delivery direction corresponds to a direction of rotation of the eccentric from the inlet to the outlet, in which direction the eccentric is rotated during delivery. The predefined angle is preferably between 5° and 45°.

An inlet and an outlet are normally arranged in the immediate vicinity of the at least one partition, which prevents a backflow from the outlet back to the inlet. The vicinity of the partition refers to a rotational angle range of the eccentric in front of and behind the partition.

The deformable diaphragm is typically deformed to a particularly great extent by the eccentric specifically in the vicinity of the partition, because the partition additionally reduces the volume available for the deformable diaphragm. Therefore, additional internal forces can arise in particular in front of the partition (when the eccentric is moved toward the partition or the outlet) and/or behind the partition (when the eccentric is moved away from the partition or away from the outlet), which additional internal forces are imparted by the deformable diaphragm and have an effect on the force equilibrium on the eccentric. For this reason, it is advantageous for the predefined park position to be arranged such that the eccentric is arranged behind the inlet or behind the partition by a (first) predefined angle and/or in front of the outlet or in front of the partition by a second predefined angle. The (first) predefined angle is preferably at least 5° and at most 45°. The second predefined angle is preferably at most 45° and at least 5°. It is also possible for both of the described predefined park positions (in front of the inlet and behind the outlet) to be provided.

In the predefined park position, which is provided downstream of the inlet by a (first) predefined angle, a force typically exists that is imparted by the deformable diaphragm and which acts in the delivery direction of the eccentric and exerts a torque on the eccentric. At the same time, a backward-turning force exists that is exerted on the eccentric by the liquid. These two forces cancel one another out.

The method is furthermore advantageous if the pump is constructed such that the eccentric passes through the predefined park position at least once during one complete revolution.

This may, for example, be ensured by virtue of the eccentric forming precisely one (single) seal, and the predefined park position being configured such that the seal thus closes off the one (single) outlet of the pump there. When the eccentric is then moved onward through 360°, the seal closes off the outlet again, such that the eccentric is situated in the predefined park position again.

It is also conceivable for the pump to have multiple outlets, or for the eccentric to form multiple seals, such that, for example, during one complete revolution of the pump, it is possible for two predefined park positions or, for example, even three or four predefined park positions to be provided. It is preferably the case that, if two predefined park positions are provided, the eccentric passes into a predefined park position again after a rotation of the eccentric through 180°. If three predefined park positions are provided, the eccentric must preferably be rotated onward through precisely 120° in order to pass from one predefined park position into the next predefined park position.

The greater the number of predefined park positions provided, and the smaller the angle through which the eccentric must be rotated onward in order to pass from one predefined park position into the next predefined park position, the greater the accuracy with which delivery or operation of a device is possible in accordance with the described method. Specifically, it is then possible for the dosing accuracy to be regulated in a more detailed and accurate manner.

The method is furthermore advantageous if the at least one outlet of the at least one pump is adjoined by a pressure line that leads to an injector for the dosed dispensing of the liquid, wherein the dispensed amount of liquid can be adjusted by way of the pressure in the pressure line and the opening time of the injector.

Here, the pump of the described device is used to build up the pressure in the pressure line. On the pressure line there is preferably arranged a pressure sensor by which the pressure in the pressure line is monitored.

Whenever the pressure in the pressure line falls, the pump is activated in order to build up the pressure in the pressure line again.

If a device designed in this way is used for executing the described method, it may be desirable for the amount of liquid dosed by way of the injector to correspond exactly to a multiple of the delivery amount delivered by the pump when the eccentric is moved from one predefined park position to the next predefined park position. At the same time, the execution of the described method makes it possible to perform highly accurate dosing of the liquid. In particular, the dosed amount of liquid is monitored twofold, specifically firstly through the monitoring of the opening time of the injector, and secondly through the (defined) delivery of the liquid by way of the pump.

The described method is furthermore advantageous if the at least one outlet of the at least one pump is adjoined by a pressure accumulator and an injector, and the pump delivers the liquid into the pressure accumulator, wherein the amount of liquid dispensed by the device can be adjusted by way of the pressure in the pressure accumulator and the opening time of the injector.

A pressure accumulator is commonly characterized by a pressure dependency of its volume. The volume of the pressure accumulator increases or decreases in size in a manner dependent on the level of the pressure in the pressure accumulator. A device having a pressure accumulator can preferably be operated in an operating pressure range which may lie for example between 5 bar and 10 bar. In the range of the operating pressures, the amount of liquid metered by the injector during a particular opening time exhibits only a small dependency on the pressure. Therefore, the pressure in the pressure accumulator does not need to correspond exactly to a defined pressure in order to be able to perform accurate dosing of the liquid by the injector. The pressure accumulator however makes it possible that the dose amount delivered by the pump for a dosing process does not need to correspond exactly to the amount actually dosed at the injector. Any excess amount of delivered liquid can be temporarily stored in the pressure accumulator. Likewise, the pressure accumulator can compensate for an insufficient amount of liquid being delivered by the pump. Therefore, the formation of a pressure accumulator between the pump and the injector permits a more exact adaptation of the amount of liquid actually dosed by the injector than is possible without the provision of a pressure accumulator between the pump and the injector.

It is also possible for the pressure accumulator to be formed by an elastic or flexible pressure line from the injector to the pump. A pressure line of this type may be formed, for example, by an elastic plastics hose.

The method is furthermore advantageous if the at least one pump has a minimum delivery volume, which is delivered by the at least one pump when the eccentric is moved onward from one predefined park position into a next predefined park position, and the pressure accumulator has a maximum pressure accumulator operating volume, by which the volume of the pressure accumulator changes when the pressure in the pressure accumulator increases from a minimum operating pressure to a maximum operating pressure, wherein the maximum pressure accumulator operating volume is at least equal to the minimum delivery volume.

The minimum delivery volume is determined by the volume of the delivery path within the pump, and the number of provided park positions during a rotation of the eccentric through 360°. The minimum operating pressure and the maximum operating pressure are, in each case, the pressure limits between which the injector of the device can be operated if it is sought to achieve accurate dosing by way of the injector. The minimum operating pressure has the effect that the pressure accumulator has a minimum pressure accumulator volume that may arise during normal operation. The maximum operating pressure has the effect that the pressure accumulator has a maximum pressure accumulator operating volume that may arise during normal operation of the device. The minimum operating pressure may, for example, correspond to 5 bar. The maximum operating pressure may, for example, correspond to 10 bar. The pressure accumulator operating volume is the difference between the maximum pressure accumulator volume and the minimum pressure accumulator volume of the pressure accumulator during normal operation. If the pressure accumulator operating volume is larger than the minimum delivery volume of the pump, it is ensured that any desired amount of liquid can be dosed by the injector, without the position of the eccentric of the pump having to be taken into consideration for the dosing.

Also proposed is a motor vehicle, at least having an internal combustion engine, an exhaust-gas treatment device for the purification of the exhaust gases of the internal combustion engine, and a device for delivering a liquid to the exhaust-gas treatment device, wherein the device is configured to be operated in accordance with a described method, and the liquid is urea-water solution.

In the exhaust-gas treatment device there is preferably provided an SCR catalytic converter with which the method of selective catalytic reduction can be performed, wherein nitrogen oxide compounds in the exhaust gas of the internal combustion engine are reduced with the liquid to form non-harmful substances. The device may have all of the refinement features discussed here in conjunction with the described method. The method steps may for example be stored in a separate control unit and/or in a controller of the internal combustion engine, wherein the control unit and/or controller can interact as required with the electric drive of the at least one pump, with the injector, with a pressure sensor, with a memory element for limit values, and the like.

BRIEF DESCRIPTION OF THE DRAWINGS

The invention and the technical field will be explained in more detail below on the basis of the figures. In particular, it should be noted that the figures and in particular the proportions illustrated in the figures are merely schematic. In the figures.

DETAILED DESCRIPTION OF THE PRESENTLY PREFERRED EMBODIMENTS

Figure 1:
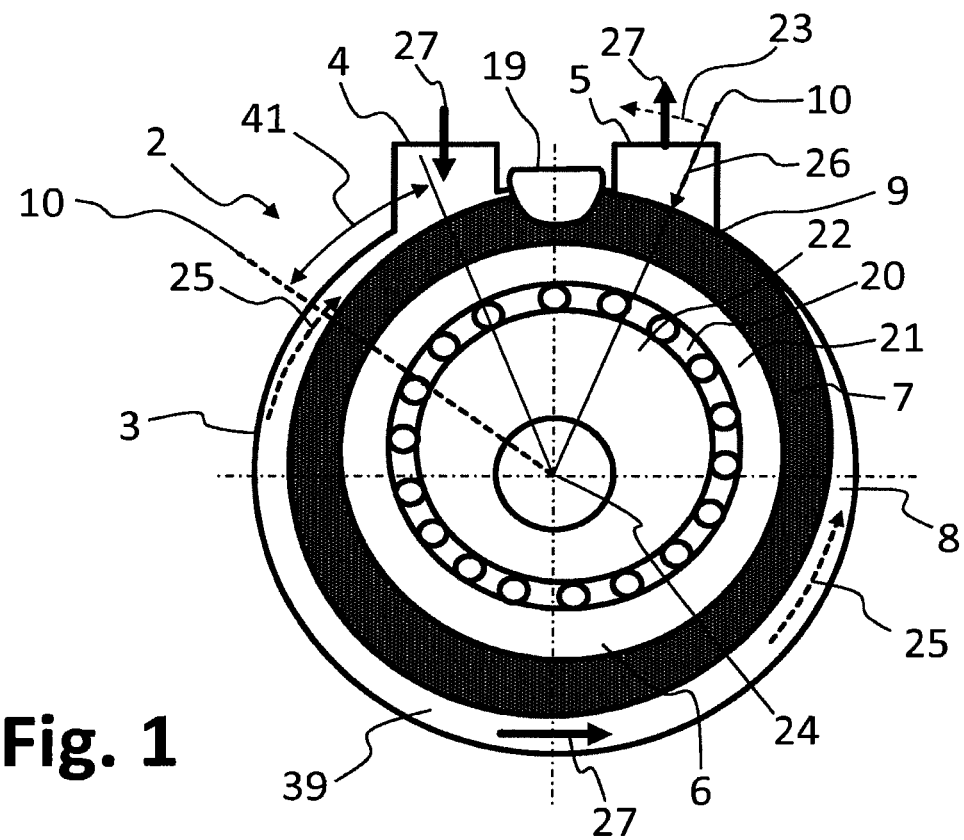
FIG. 1: shows a first design variant of a pump.

FIG. 1 illustrates a pump 2 having a pump housing 3 with an inlet 4 and an outlet 5. An eccentric 6 is arranged within the pump housing 3. The deformable diaphragm 7 is situated between the eccentric 6 and the pump housing 3. Between the deformable diaphragm 7 and the pump housing 3 there is a delivery path 8, which runs from the inlet 4 to the outlet 5. The delivery path 8 is sealed off (closed off) at one point by a seal 9. At the seal 9, the deformable diaphragm 7 bears directly against the pump housing 3. The seal 9 can be displaced by way of an eccentric movement of the eccentric 6. This gives rise to a delivery of the liquid in a delivery direction 27 from the inlet 4 to the outlet 5. The eccentric 6 is divided into an inner eccentric region 22 and an outer bearing ring 21. The inner eccentric region 22 is separated from the outer bearing ring 21 by a bearing 20. When the eccentric region 22 is rotated about the axis 24 in a direction of rotation 23 corresponding to the delivery direction 27, the bearing ring 21 performs the described eccentric movement. Between the inlet 4 and the outlet 5 there is provided a partition 19, which in this case is in the form of a cam that locally compresses the deformable diaphragm 7. The partition 19 prevents a backflow of the liquid from the outlet 5 back to the inlet 4.

During operation, the liquid is present within the delivery path 8 with a particular pressure. The pressure is considerably lower in those regions of the delivery path 8 that are connected to the inlet 4 than in those regions of the delivery path 8 that are connected to the outlet 5. By virtue of the park position 10 of the eccentric 6 being oriented such that the seal 9 closes off the outlet 5, it is achieved that no significant part of the delivery path 8 is connected to the outlet 5. Accordingly, the tangential forces 25 acting on the eccentric 6 can be reduced, or it can even be ensured that that tangential forces 25 cancel one another out. Then, at the outlet 5, only radial forces 26 act on the eccentric 6, which radial forces however do not exert a torque on the eccentric 6.

FIG. 1 also illustrates an alternative predefined park position 10 which is arranged upstream of the outlet 4 of the pump 2 by a predefined angle 41 as viewed in the delivery direction 27 or in the direction of rotation 23. In FIG. 1, the eccentric 6 is not situated in the alternatively proposed predefined park position 10.

Figure 2:
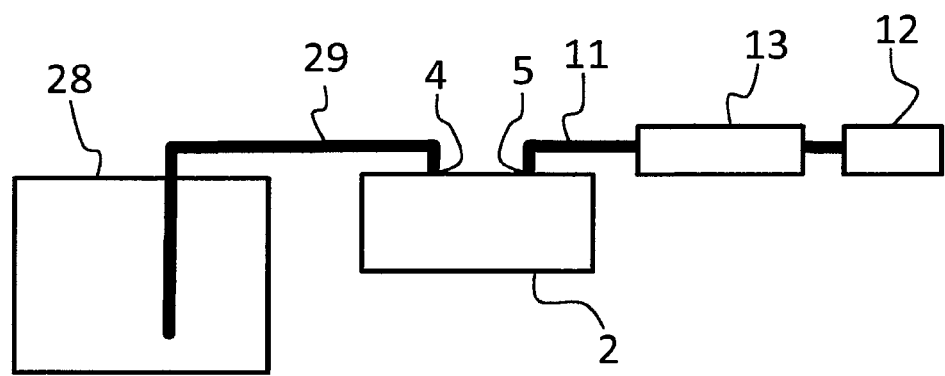
FIG. 2: shows a device with which the described method can be executed.

FIG. 2 shows a device 1 having a pump 2 and a suction line 29, which connects an inlet 4 of the pump 2 to a tank 28, and a pressure line 11, which connects an outlet 5 of the pump 2 to an injector 12.

The pressure line 11 forms a pressure accumulator 13 in which pressurized liquid is stored.

Figure 3:
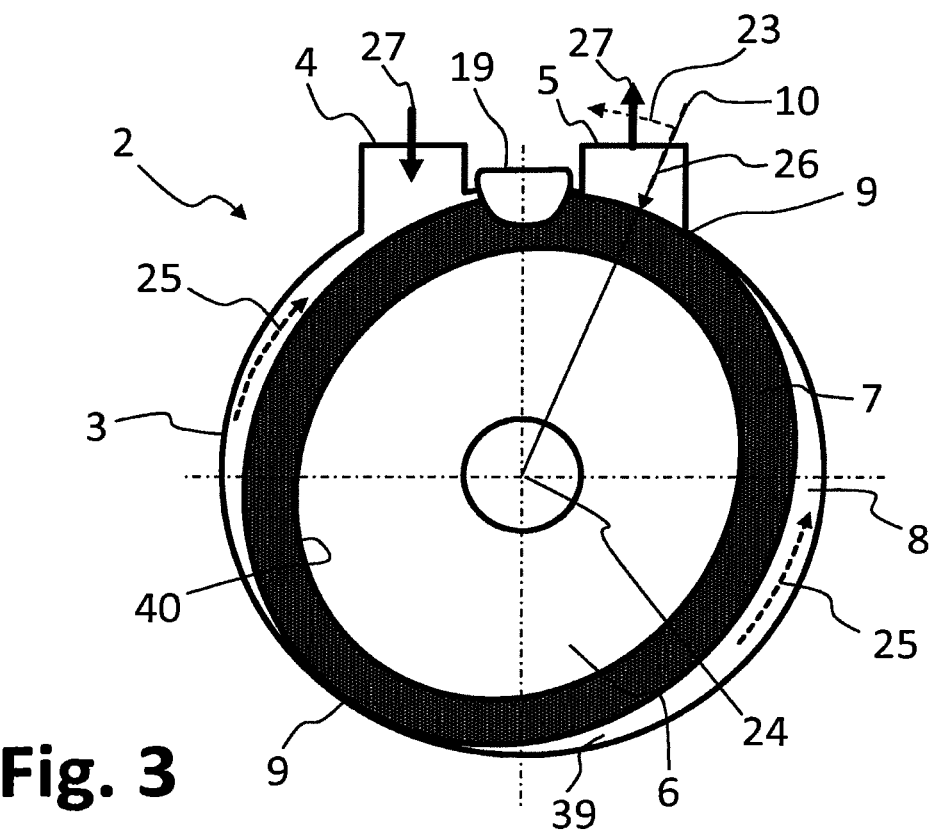
FIG. 3: shows a second design variant of a pump.

FIG. 3 shows a second design variant of a pump 2 for a described device, which differs from the pump illustrated in FIG. 1 in that the eccentric 6 and the deformable diaphragm 7 form two seals 9 which are moved along the delivery path 8 as a result of a rotational movement of the eccentric 6 relative to the pump housing 3. In this design variant of a pump 2, it is also the case that two different predefined park positions 10 are provided, in which the outlet 5 of the pump 2 is closed off by the seal 9. The two predefined park positions 10 are arranged at an angle of 180° with respect to one another. When the eccentric 6 is moved onward through 180°, a movement of the eccentric 6 from one predefined park position 10 into the next predefined park position 10 is possible. In the case of this pump 2, however, there is no division of the eccentric 6 into a bearing ring and an eccentric region. In this design variant, the eccentric 6 rotates such that, at a contact surface 40 between the eccentric 6 and the deformable diaphragm 7, friction forces arise which are avoided by way of a corresponding friction-minimized design of the contact surface 40.

Figure 4:
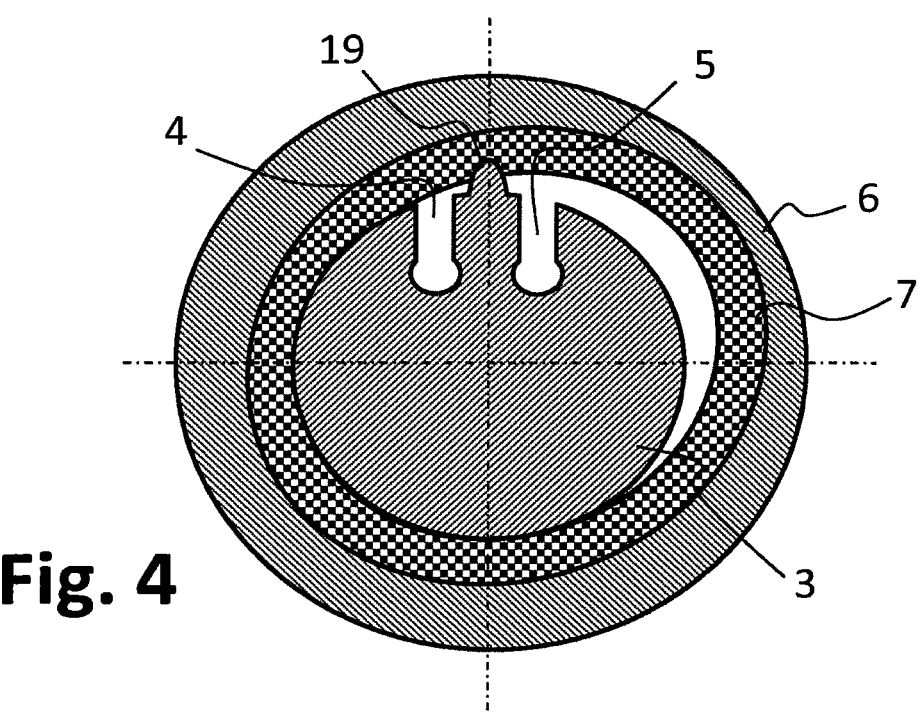
FIG. 4: shows a third design variant of a pump.

FIG. 4 shows, in highly schematic form, a further design variant of a pump 2, in which the pump housing 3 is arranged at the inside and the eccentric 6 is arranged around the pump housing 3 at the outside. Here, too, the deformable diaphragm 7 is situated between the pump housing 3 and the eccentric 6. The inlet 4 and the outlet 5 are arranged on the pump housing 3, and a partition 19 is provided for preventing a backflow of the liquid from the outlet 5 to the inlet 4.

Figure 5:
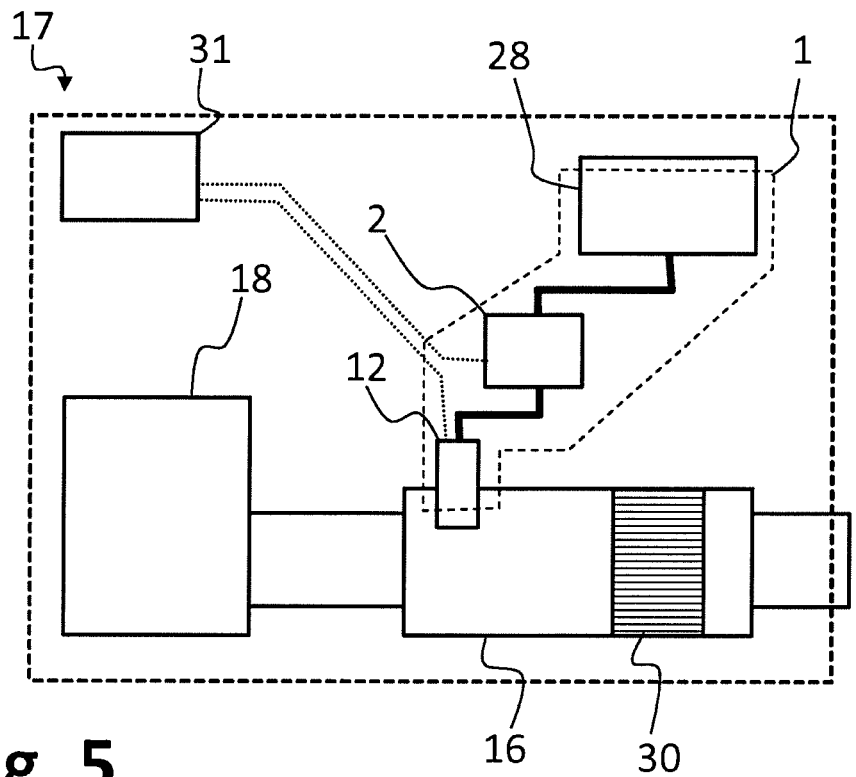
FIG. 5: shows a motor vehicle having a device with which the described method can be executed.

FIG. 5 shows a motor vehicle 17, having an internal combustion engine 18 and an exhaust-gas treatment device 16 for the purification of the exhaust gases of the internal combustion engine 18, in which exhaust-gas treatment device there is arranged an SCR catalytic converter 30.

The exhaust-gas treatment device 16 can be supplied with liquid by an injector 12. The injector 12 is a constituent part of a device 1 which extracts the liquid from a tank 28 and delivers the liquid to the injector 12 by way of a pump 2. At least the pump 2 and the injector 12 are connected to a control unit 31 by which the execution of the described method can be performed. The described method may be implemented as a routine in the control unit 31.

Figure 6:
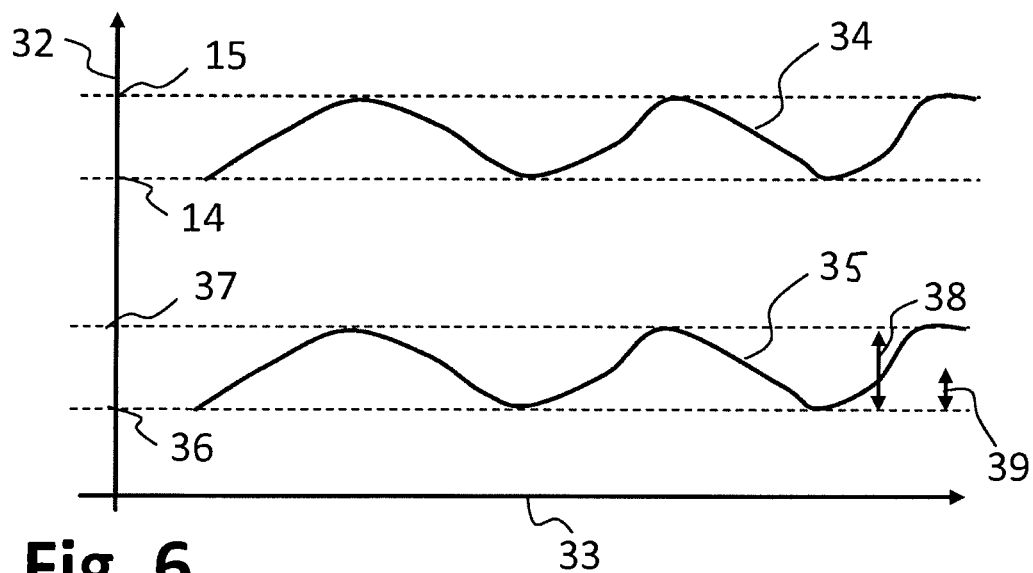
FIG. 6: shows a diagram of the pressure and of the volume of a pressure accumulator of a device during the execution of the described method.

FIG. 6 shows, in a diagram and by way of an example, a pressure curve 34 and a volume curve 35 which are each plotted on the vertical axis 32 versus the time on the time axis 33. The pressure curve 34 arises in a pressure accumulator of a described device during the execution of the described method. During the execution of the described method, the pressure in the pressure accumulator fluctuates between a minimum operating pressure 14 and a maximum operating pressure 15. In a manner dependent on the pressure, a pressure accumulator volume is generated in the pressure accumulator, the pressure accumulator volume being illustrated in the diagram by way of the volume curve 35. The volume of the pressure accumulator fluctuates between a minimum pressure accumulator volume 36 and a maximum pressure accumulator volume 37. The difference between the minimum pressure accumulator volume 36 and the maximum pressure accumulator volume 37 constitutes the pressure accumulator operating volume 38. The pressure accumulator operating volume is larger than the minimum delivery volume 39 delivered by the pump during the delivery when the eccentric is transferred from one predefined park position into the next predefined park position.

By way of precaution, it should also be noted that the combinations of technical features shown in the figures are not generally binding. For example, technical features from one figure may be combined with other technical features from a further figure and/or from the general description. The only exception to this is if the combination of features has been explicitly referred to here and/or a person skilled in the art identifies that the basic functions of the device can no longer be realized otherwise.

The described method is particularly advantageous because accurate dosing of the liquid can be performed by means of one device, wherein at the same time, the method yields a minimal energy requirement for performing the delivery and the dosing.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a device (1) configured to provide a dosed supply of a liquid, the device (1) having: at least one pump (2) configured to deliver the liquid, the at least one pump (2) having a pump housing (3) having at least one inlet (4) and at least one outlet (5); an eccentric (6) arranged on the pump housing (3), and a deformable diaphragm (7) arranged between the pump housing (3) and the eccentric (6), the deformable diaphragm (7) and the pump housing (3) delimiting between one another at least one delivery path (8) from the at least one inlet (4) to the at least one outlet (5) and forming at least one seal (9) of the delivery path, the at least one seal (9) being displaceable along the delivery path (8) by a movement of the eccentric (6) to deliver the liquid, the method comprising:
providing a partition comprising a depression, in the pump housing (3), that locally depresses the deformable diaphragm (7), the partition being arranged between the at least one inlet (4) and the at least one outlet (5) and preventing undesired backflow of the liquid from the at least one outlet (5) to the at least one inlet (4);
detecting a demanded dose amount of the liquid;
activating the at least one pump (2) to deliver the liquid by the at least one pump (2), by displacing, by a movement of the eccentric (6), the at least one seal along the delivery path defined between the deformable diaphragm (7) and the pump housing (3), the at least one seal being formed by the deformable diaphragm (7) bearing directly against the pump housing; and
stopping operation of the at least one pump (2) when the delivered amount of the liquid corresponds to the demanded dose amount so that the eccentric (6) is situated in a predefined park position (10).

2. The method as claimed in claim 1, wherein the eccentric (6) is configured to be in force equilibrium when in the predefined park position (10).

3. The method as claimed in claim 1, further comprising, in the predefined park position (10), closing off, by the at least one seal (9), the at least one outlet (5) of the at least one pump (2).

4. The method as claimed in claim 1, further comprising, in the predefined park position (10), arranging the at least one seal (9) downstream of the inlet (4) of the at least one pump (2) by a predefined angle (41) as viewed in a delivery direction (27).

5. The method as claimed in claim 1, wherein the at least one pump (2) is configured such that the eccentric (6) passes through the predefined park position (10) at least once during one complete revolution.

6. The method as claimed in claim 1, wherein the at least one outlet (5) of the at least one pump (2) is adjoined by a pressure line (11) leading to an injector (12) configured to provide dosed dispensing of the liquid, the method further comprising adjusting the dispensed amount of liquid in accordance with pressure in the pressure line (11) and an opening time of the injector (12).

7. The method as claimed in claim 1, wherein the at least one outlet (5) of the at least one pump (2) is adjoined by a pressure accumulator (13) and an injector (12), and the at least one pump (2) delivers the liquid into the pressure accumulator (13), the method further comprising adjusting the amount of liquid dispensed by the device (1) in accordance with pressure in the pressure accumulator (13) and an opening time of the injector (12).

8. The method as claimed in claim 7, wherein the pressure accumulator (13) comprises an elastic pressure line (11) from the at least one pump (2) to the injector (12).

9. The method as claimed in claim 7, wherein the at least one pump (2) has a minimum delivery volume (39) delivered by the at least one pump (2) when the eccentric (6) moves from one predefined park position (10) into a next predefined park position (10), and the pressure accumulator (13) has a maximum pressure accumulator operating volume (38), by which the volume of the pressure accumulator (13) changes when the pressure in the pressure accumulator (13) increases from a minimum operating pressure (14) to a maximum operating pressure (15), wherein the maximum pressure accumulator operating volume (38) is at least equal to the minimum delivery volume (39).

10. A motor vehicle (17) comprising:
an internal combustion engine (18);
an exhaust-gas treatment device (16) configured to purify exhaust gases of the internal combustion engine (18); and
a device (1) configured to deliver a liquid consisting of urea-water solution to the exhaust-gas treatment device (16), the device (1) having: at least one pump (2) configured to deliver the liquid, the at least one pump (2) having a pump housing (3) having at least one inlet (4) and at least one outlet (5); an eccentric (6) arranged on the pump housing (3), and a deformable diaphragm (7) arranged between the pump housing (3) and the eccentric (6), the deformable diaphragm (7) and the pump housing (3) delimiting between one another at least one delivery path (8) from the at least one inlet (4) to the at least one outlet (5) and forming at least one seal (9) of the delivery path, the at least one seal (9) being displaceable along the delivery path (8) by a movement of the eccentric (6) to deliver the liquid,
wherein the device (1):
includes a partition comprising a depression, in the pump housing (3), that locally depresses the deformable diaphragm (7), the partition being arranged between the at least one inlet (4) and the at least one outlet (5) and preventing undesired backflow of the liquid from the at least one outlet (5) to the at least one inlet (4);

wherein the motor vehicle includes a controller (31) executing a routine configured to control delivery of the liquid by:

detecting a demanded dose amount of the liquid;

activating the at least one pump (2) to deliver the liquid by the at least one pump (2), by displacing, by a movement of the eccentric (6), the at least one seal along the delivery path defined between the deformable diaphragm (7) and the pump housing (3), the at least one seal being formed by the deformable diaphragm (7) bearing directly against the pump housing; and stopping operation of the at least one pump (2) when the delivered amount of the liquid corresponds to the demanded dose amount so that the eccentric (6) is situated in a predefined park position (10).

* * * * *